United States Patent [19]

Büsen et al.

[11] Patent Number: 4,708,756
[45] Date of Patent: Nov. 24, 1987

[54] PROCESS OF PRODUCING A PLIABLE ROLLER

[75] Inventors: Dietmar Büsen, Fürth; Helmut Schlüter, Reichelsheim; Arnold Weghmann, Weinheim-Lützelsachsen; Norbert Blümler, Hemsbach; Bohuslav Tecl, Weinheim-Lützelsachsen, all of Fed. Rep. of Germany

[73] Assignee: Firma Carl Freudenberg, Weinheim, Fed. Rep. of Germany

[21] Appl. No.: 904,508

[22] Filed: Sep. 5, 1986

[30] Foreign Application Priority Data

Sep. 17, 1985 [DE] Fed. Rep. of Germany ....... 3533045

[51] Int. Cl.$^4$ ............................................. B32B 31/00
[52] U.S. Cl. .................................. 156/143; 156/187; 156/195
[58] Field of Search ............... 156/195, 143, 187, 188, 156/194; 29/127

[56] References Cited

U.S. PATENT DOCUMENTS

| 2,807,124 | 9/1957 | Tachon | 29/127 X |
| 3,111,442 | 11/1963 | Voisin | 156/195 X |
| 3,141,806 | 7/1964 | Reinman | 156/195 X |

Primary Examiner—David Simmons
Attorney, Agent, or Firm—Felfe & Lynch

[57] ABSTRACT

A process of producing a pliable roller uses a flexible strip of material with a tension element longitudinally therealong, the tension element having a lesser longitudinal extensibility than the flexible strip of material. The tension element and the flexible strip of material are fixed together and portions of the flexible strip of material are longitudinally folded together along the tension element. At least after the fixing, the flexible strip of material with the tension element longitudinally therealong is wound, longitudinally, about a roller core in such manner as to form contiguous windings thereabout projecting outwardly from the roller core.

12 Claims, 2 Drawing Figures

PROCESS OF PRODUCING A PLIABLE ROLLER

BACKGROUND OF THE INVENTION

The invention relates to a process of producing a pliable roller.

A known process of producing a pliable roller begins with a flexible strip of material having at least one fold running parallel to its length. A tension element is placed between the folded-over portions of the flexible strip of material. One end of the flexible strip of material with the tension element in its fold is applied to a roller core and the flexible strip of material then contiguously wound up spirally about the roller core. French Pat. No. 1,091,585, for example, discloses this process.

The known process, however, only permits relatively low winding speeds and produces rollers having surface zones of different, pliable hardnesses. For this reason, the process is not very satisfactory from either economic or technical points of view.

SUMMARY OF THE INVENTION

It is, therefore, an object of the invention to provide a process for producing a pliable roller at substantially-higher winding speeds with a surface of substantially-uniform, pliable hardness.

This and other objects are achieved in a process of producing a pliable roller with a tension element to be longitudinally between longitudinally-folded portions of a flexible strip of material. The tension element and flexible strip of material are immovably fixed to each other at least before winding the flexible strip of material longitudinally about a roller core in such manner as to form adjacent and, preferably, contiguous windings thereabout when the flexible strip of material is longitudinally folded with the tension element therebetween and, preferably, therealong, preferably projecting outwardly from the roller core.

The tension element has a lesser longitudinal extensibility than the flexible strip of material and, preferably, a longitudinal extensibility which is less than 50% of that of the flexible strip of material at any particular tension load. The extension from the tension of winding the unit formed by the tension element and attached flexible strip of material is, therefore, determined essentially by the extensibility of the tension element. The extension from this single, effective extensibility is easily controllable and adjustable to precise values, even at high winding speeds thereby usable. In addition, this provides a roller shell from the winding of substantially-uniform, pliable hardness at all its surface zones without difficulty.

The material of the flexible strips employed in the process may be any of the materials used in the known process. Foamed or unfoamed flexible strips of film material may be used, for example. For making squeezing or lubricating rollers, however, for example, nonwoven fabric materials have proven advantageous, especially nonwoven fabric materials of synthetic and/or natural fibers arranged without directional preference and glued together with a binder. Aside from elastomers, synthetic-resin fibers are particularly preferable, the cross linking of the synthetic resin of the fibers preferably being undertaken after the winding step. For further example, Thermoplastic synthetic-resin materials and, especially, thermoplastic polyurethane, may be used to provide a pliable roller of particularly-good impact resistance, for example.

The tension element, which is made of a material of lesser relative extensibility than the flexible strip of the material selected, is, preferably, of low absolute extensibility. The material of the tension element must also be able to be made to be made fast to the flexible strip of material, preferably easily. It may comprise one or more filaments, the individual filaments in the latter case optionally being twisted or glued together.

The fixation of the tension element to the flexible strip of material can be accomplished in any suitable way, such as by gluing, sewing or needling, for example. The tension element may also be circumferentially and/or longitudinally fully or discretely covered or coated with another, for example, gluing material for this. Fully or partially coating the tension element with a material gluable to the material of the flexible strip is recommended, especially, when the immovable fixation of the tension element thereto is initially accomplished by needling. It is also possible to produce the tension element and fix it to the flexible strip of material at the same time, for example, by printing or spinning a liquified polymeric material directly onto the flexible strip of material and, thereafter, hardening it. This assures intimate mutual connection between the tension element and the flexible strip of material, and saves a separate, fixation step in the process. In any case, it is preferably to fix the tension element to the flexible strip of material before the latter is folded. This makes it easier to produce a precise mutual arrangement.

During the winding process, the tension element is inherently subjected to a continuous tensile stress so that the part of the flexible strip of material lying radially within the tension element is pressed firmly against the roller core. At the same time, axial pressure may be applied to the flexible strip of material. This is especially helpful in achieving greater strength of the roller shell obtained by the winding.

To aid starting the winding on the roller core, one end of the tension element at a corresponding end of the flexible strip of material is preferably arranged for attachment to the roller core. This may be done, for example, by projecting the end of the tension element beyond the corresponding end of the flexible strip of material.

In the simplest case, the flexible strip of material is provided with only a single fold along the tension element. Providing several, parallel folds in the flexible strip of material with one or more tension elements allocated to these folds is, however, also possible to produce oversized roller shells even more rapidly, for example.

BRIEF DESCRIPTION OF THE DRAWINGS

Merely-preferred processes, which illustrate but do not limit the invention, will now be described with reference to drawings, in which.

DESCRIPTION OF PREFERRED PROCESSES

Figure 1:
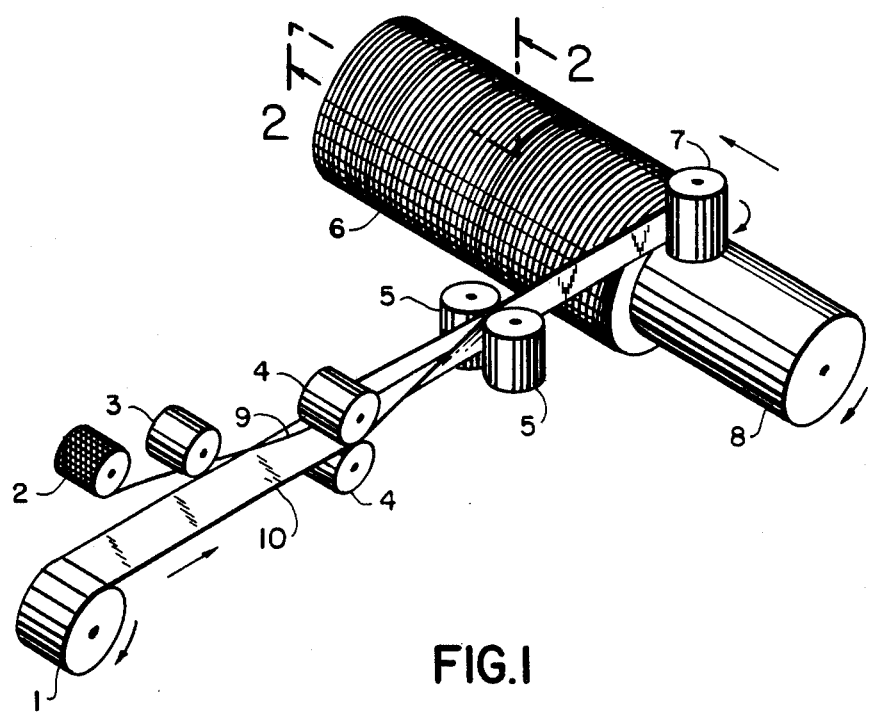
FIG. 1 is a perspective view of one preferred process.

The preferred process shown in FIG. 1 unwinds a flexible strip of material 10 from a roll 1 thereof, initially by having one end of the flexible strip of material 10 and/or a tension element 9 which is fixed thereto (as later described) attached to a roller core 8 which is turning at a uniform speed as indicated by the arrow thereon. The unwinding attachment is by the previously-wound turns of the partially-complete roller shell 6 at the left-hand portion of the roller core 8 in FIG. 1.

The tension element 9 is unwound from a supply roll 2 thereof above the material 10, brought into contact with a wetting roller 3, and deposited centrally on the upper side of the strip of material 1. The wetting roller 3 is saturated with adhesive (not shown) which is, therefore, transferred to the tension element as it moves past the wetting roller to the upper side of the strip of material. Thereafter depositing the tension element on the upper side of the flexible strip of material therefore results in mutual, immmovable adhesion of fixation of the tension element on the flexible strip of material. This is assisted, in this case, by passing the tension element and flexible strip of material through back-pressure roller-pair 4 as or after the tension element is deposited on the flexible strip of material.

After passing between the back-pressure roller-pair 4, the portions of the previously-flat flexible strip of material on either side of the adhered tension element are progressively folded upwards to form a V therealong until, finally, they contact each other. This folded shape of the flexible strip of material with the tension element in the fold is at least stabilized by passing the same through another back-pressure roller-pair 5 having axes perpendicular to the rotational axis of the roller core 8.

Figure 2:
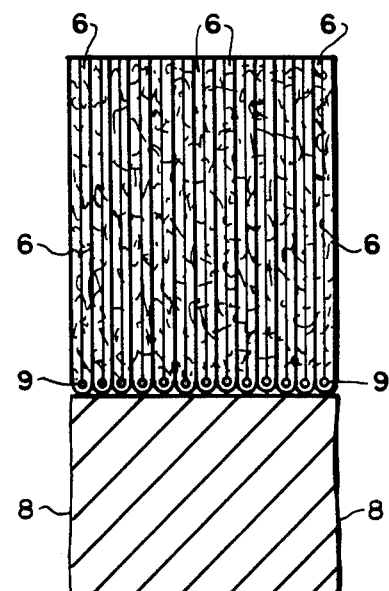
FIG. 2 is an axial section of a portion of a pliable roller made by the preferred processes.

The folded, flexible strip of material is then passed to the roller core with the fold on the roller core, as folded. Its resulting, adjacent windings formed about the roller core as it rotates are pressed into contiguous, mutually-contacting coiled layers or windings of the roller shell 6 by a pressure roller 7. The tension element is, therefore, immediately adjacent the roller core as shown in FIG. 2.

Because of this and the adhesion of the tension element and flexible strip of material before winding, the tension inherent in the winding process is substantially absorbed by the tension element 9. The greater and, perhaps, uneven extension or stretching of the flexible strip of material which could result in the absence of the prior adhesion to the tension element is, thus, reliably avoided.

The pressure roller 7 maintains pressure on the folded, flexible strip of material in the direction of the already-wound roller shell 6, i.e., in the axial direction of the roller core 8 indicated by the arrow above the pressure roller 7. This pressure controls the hardness of the roller shell 6.

At least pressure roller 7, and possibly the back-pressure roller-pairs 4,5, could be replaced by curved pressure shoes in other apparatus for the process, for example.

Another preferred process is explained with the following example:

EXAMPLE

A cylindric, steel roller core with a diameter of 150 mm has had its cylindric surface roughened by a knurling process and coated with a coupling agent to improve adhesion of a roller shell to be applied thereto. The coupling agent comprises an epoxide resin coated on the roller core to a thickness of about 1 mm and then converted into the state generally identified in the art as "C" by drying at moderate temperatures.

To produce the roller shell, a nonwoven material of about 1.4 denier, about 100% amide fibers combined without directional preference and joined together into the material by needling is used. The weight per unit area of the material is about 95 g/m$^2$. The nonwoven material is then cut into strips about 40 mm wide.

A glass-filament tension element of a titer of about 800 tex is longitudinally placed centrally width-wise and longitudinally along one of the strips. Another of the strips is then superposed on this one with the tension element between the strips and the strips combined into the flexible strip of the material for the process by needling.

Discrete deposits of an epoxide resin have been printed on the glass-filament tension element at about 500 mm intervals. These are heated sufficiently for curing to immovably affix the glass-filament tension element to the flexible strip of the material.

One end of the glass-fiber tension element at a corresponding end of the flexible strip of the material is fixed to one axial end of the roller core. The roller core is then rotated to wind the flexible strip of the material progressively in a spiral about the periphery of the roller core.

In order to achieve good mutual adhesions, the flexible strip of the material is passed continuously through a bath of a liquid epoxide resin before and, for example, as it is drawn to the roller core for winging thereabout. The liquid epoxide resin serves, among other things, as a binder for the material of the flexible strip.

The portions of the flexible strip of the material laterally, i.e. width-wise, on either side of the glass-fiber tension element are subsequently, during, preferably, or after the winding, folded up along the glass-fiber tension element against each other to project outwardly of the winding and axis of the roller core and subjected to continuous axial pressure. The axial pressure is maintained while the completely-wound roller core is transferred to a hot room for curing the liquid epoxide resin into the binder at a temperature of about 100° C. over a period of about 5 hours. The roller is then removed form the hot room and, after release of the axial pressure, the windings of the thus-formed roller shell can be finished, for example, by lathing and/or grinding down its outer periphery.

The roller produced in this way by this process is distinguished by completely even surface quality, regardless of the size of the roller, especially with respect to pliable hardness, abrasion resistance, smoothness, and elasticity of the surface.

The specific process parameters identified can be adjusted to almost any values appropriate for the choice of tension during winding, axial pressure after folding, and binder, nonwoven fabric and tension element materials. The described of adjusted process parameters can be realized time and again for invaryingly reproducible roller quality.

It will be understood that the specification and example are illustrative but not limitative of the present invention and that other embodiments within the spirit and scope of the invention will suggest themselves to those skilled in the art.

What is claimed is:

1. A process of producing a pliable roller, comprising:
providing a flexible strip of material with a tension element longitudinally therealong, the tension element having a lesser longitudinal extensibility than the flexible strip of material;

fixing the tension element and the flexible strip of material immovably together so as to prevent substantial relative longitudinal movement of the tension element and flexible strip of material during subsequent winding about a roller core;

longitudinally folding together portions of the flexible strip of material with the tension element therebetween; and at least after the fixing, winding the flexible strip of material with the tension element longitudinally therealong longitudinally about a roller core in such a manner as to form adjacent windings thereabout;

whereby the tension element prevents uneven stretching of the flexible strip of material during winding.

2. The process of claim 1, wherein the folding comprises folding along the tension element and the winding comprises winding in such manner as to form contiguous windings about the roller core which project outwardly therefrom.

3. The process of claim 1, wherein the fixing comprises gluing the tension element and the flexible strip of material together.

4. The process of claim 2, wherein the fixing comprises gluing the tension element and the flexible strip of material together.

5. The process of claim 1, wherein the fixing comprises sewing the tension element and the flexible strip of material together.

6. The process of claim 2, wherein the fixing comprises sewing the tension element and the flexible strip of material together.

7. The process of claim 3, wherein the fixing comprises sewing the tension element and the flexible strip of material together.

8. The process of claim 4, wherein the fixing comprises sewing the tension element and the flexible strip of material together.

9. The process of claim 1, wherein the fixing comprises needling the tension element and the flexible strip of material together.

10. The process of claim 2, wherein the fixing comprises needling the tension element and the flexible strip of material together.

11. The process of claim 3, wherein the fixing comprises needling the tension element and the flexible strip of material together.

12. The process of claim 4, wherein the fixing comprises needling the tension element and the flexible strip of material together.

* * * * *